Feb. 3, 1931.                R. F. KRAUSE                1,791,361
                    STEAM VALVE FOR WATERLESS COOKERS
                          Filed Sept. 23, 1927

Inventor
R. F. Krause
By Frease and Bond
Attorneys

Patented Feb. 3, 1931

1,791,361

UNITED STATES PATENT OFFICE

RICHARD F. KRAUSE, OF MASSILLON, OHIO, ASSIGNOR TO THE ENTERPRISE ALUMINUM COMPANY, OF MASSILLON, OHIO, A CORPORATION OF OHIO

STEAM VALVE FOR WATERLESS COOKERS

Application filed September 23, 1927. Serial No. 221,467.

The invention relates to cooking utensils, and more particularly to a waterless cooker in which the food is arranged to be steam cooked, and adapted to retain the vapors up to a certain desired high pressure.

The object of the improvement is to provide a cooker of this type having a lid or cover adapted to tightly fit thereon, and provided with a valve arranged to normally remain closed, in order to seal the vessel and retain the vapors therein until a certain desired high pressure is created therein; the valve being adapted to automatically open when the pressure goes beyond the desired point, permitting the escape of the steam and vapors from the vessel, only until the pressure is lowered to the desired point, at which time the valve automatically closes, thus retaining substantially all of the vapors and flavor of the cooking food and at the same time providing a safety valve to prevent the pressure from reaching the danger point.

A further object is to provide mechanical means for holding the valve in an open position when continuous escapement of steam is desired.

Means are also provided for preventing turning or twisting of the valve, during operation, and for preventing accidental displacement or separation of the valve from the lid or cover of the utensil.

The above and other objects may be attained by constructing the improved valve in the manner illustrated in the accompanying drawing, in which—

Figure 1:
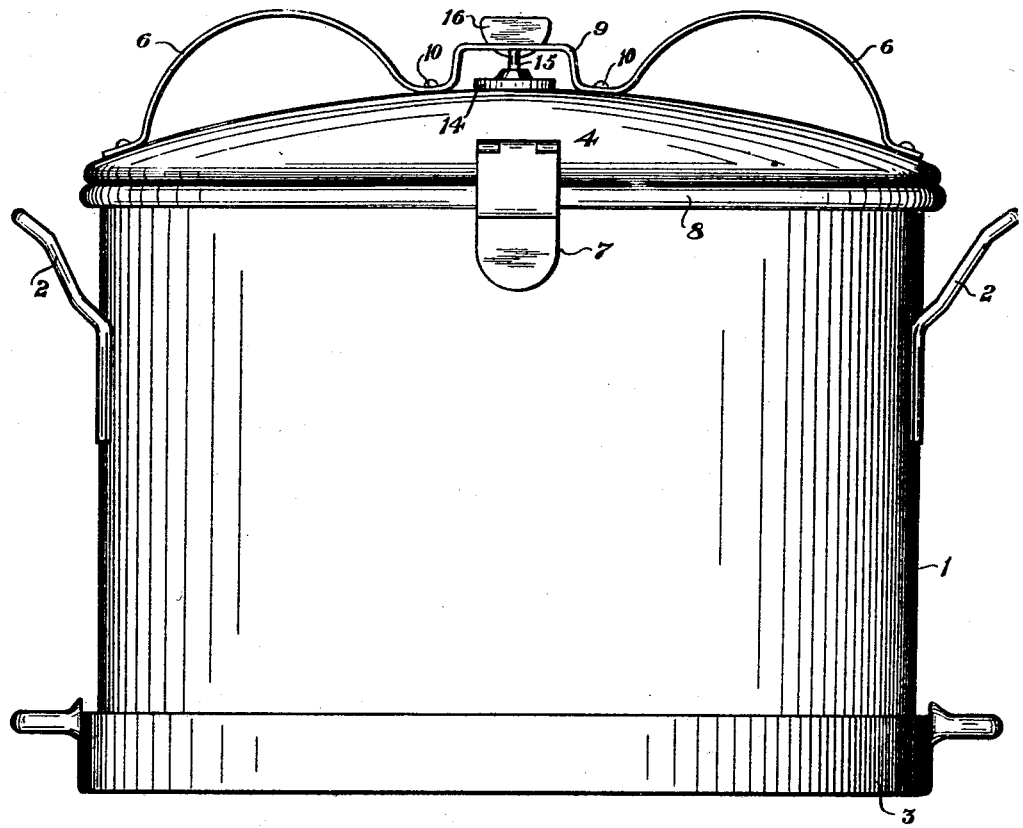
Figure 2:
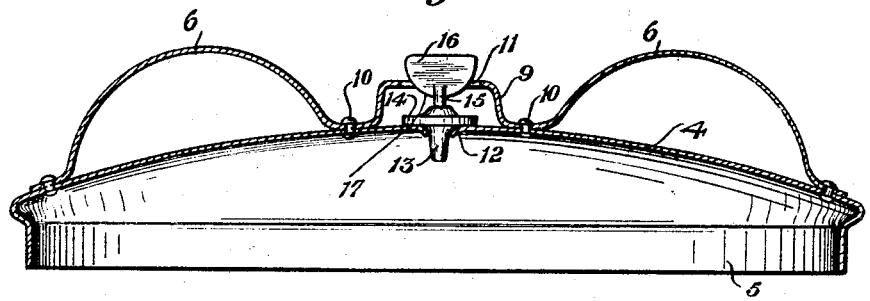
Figure 3:
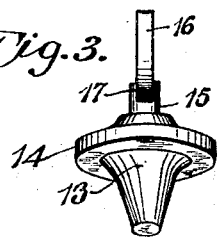
Figure 4:
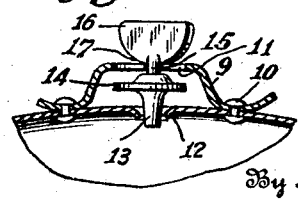

Figure 1, is a side elevation of a waterless cooker, having a tight fitting lid or cover provided with the improved steam valve to which the invention pertains;

Fig. 2, a sectional view through the lid or cover showing the connection of the improved valve thereto;

Fig. 3, an enlarged, detail, perspective view of the improved valve;

Fig. 4, a fragmentary sectional view through the lid or cover showing the improved valve maintained in raised position.

Similar numerals refer to like parts throughout the specification.

The cooker, to which the valve is applied, may be of any suitable construction, as illustrated generally at 1, and may be provided with handles 2, for placing the cooker proper upon the base 3, or removing it therefrom.

The lid or cover 4 may be convex, as shown, and is preferably provided with the depending flange 5, adapted to fit snugly within the upper, open end of the cooker proper 1, and seal the joint between the cooker and the cover, effectually preventing the escape of any steam or vapors from the cooking food at this point.

Handles 6 may be provided upon the top of the lid for removing the same from the cooker, or replacing the same thereon, and, if desired, suitable clamping means, as shown at 7, may be carried by the cover for engagement with the lip bead or flange 8, upon the cover, in order to clamp the cover tightly upon the cooker.

An inverted, U-shaped band or strip 9 may be attached to the upper side of the central portion of the cover, as by the rivets 10, or the like, and is preferably provided with the longitudinal slot 11, centrally located therein.

The cover is provided, centrally beneath the U-shaped strip 9, with a depending, conical valve seat 12, arranged to receive the tapered or conical portion 13 of the improved steam valve, the flange or shouldered portion 14 of said valve being arranged to seat upon the top of the lid or cover, as shown in Figures 1 and 2.

The valve stem 15 extends upward, above the flange 14, and is provided, at its upper end, with a flat blade 16, slidably located through the slot 11, in the strip 9, preventing rotation or side movement of the valve relative to the valve seat, and permitting only perpendicular movement thereof.

The slot 11, in the strip 9, being only wide enough to permit the blade 16 to slide freely therein, it will be obvious that the valve cannot be raised sufficiently to permit the same to be entirely disengaged from the valve seat.

In the operation of the device, the food to be cooked is placed within the cooker, and the same is set over a fire, upon the base 3. The lid or cover is tightly clamped upon the cooker and no further attention to the same is required, until the food is completely cooked.

The weight of the valve is such that the pressure of steam and vapors, created by the cooking food, will not act to raise the valve until the danger point is approached, at which time the steam pressure will be sufficient to open the valve and permit the escape of steam until the danger point is passed, at which time the valve will automatically close, again sealing the cooker, and thus retaining substantially all of the vapors and flavor of the food.

The cooker proper, cover and valve may all be formed of aluminum, although it should be understood that any or all of these parts may, if desired, be formed of other suitable and well known material.

From the above, it will be obvious that a very simple and effective steam valve is provided, which will automatically operate to retain substantially all of the vapors and flavors of the food and at the same time act as a safety valve to prevent the steam pressure within the cooker from reaching the danger point.

In using the cooker, it may be desired at times to permit the continuous escape of steam and vapors from the vessel and allow the pressure therein to remain at atmospheric pressure. For such operation of the cooker, the valve may be raised above the valve seat so that the blade 16 is disposed entirely above the strip 9. At this time, the valve may be rotated on its axis about the valve stem 15 which is disposed through the slot 11 in the strip 9, the blade 16 being then located angularly to the direction of the slot 11, as shown in Fig. 4, and the lower edge portion 17 of the blade 16 will then rest on the top surface of the strip 9 in order to retain the valve in open position thereby allowing the continuous escape of steam therethrough.

I claim:

1. A valve of the character described including a valve seat, a strip located centrally above and adjacent to the valve seat and fixed relatively thereto and having an elongated slot therein, a valve slidably mounted in said valve seat, a flat blade carried by the valve and slidably located through said slot, a shoulder upon the valve adapted to engage one side of said strip to prevent complete disengagement of the valve from the valve seat, and the flat blade having an edge portion arranged to engage the other side of said strip when the valve is raised and turned angularly to the slot.

2. A valve of the character described including a conical valve seat, a strip located centrally above and adjacent to the valve seat and fixed relatively thereto and having an elongated slot therein, a conical valve slidably mounted in said valve seat, a flat blade carried by the valve and slidably located through said slot, a shoulder upon the valve adapted to engage one side of said strip to prevent complete disengagement of the valve from the valve seat, and the flat blade having an edge portion arranged to engage the other side of said strip when the valve is raised and turned angularly to the slot.

3. A valve of the character described including a valve seat, an inverted U-shaped strip located centrally above and adjacent to the valve and fixed relatively thereto and having an elongated slot therein, a valve slidably mounted in said valve seat, a flat blade carried by the valve and slidably located through said slot, a shoulder upon the valve adapted to engage one side of said strip to prevent complete disengagement of the valve from the valve seat, and the flat blade having an edge portion arranged to engage the other side of said strip when the valve is raised and turned angularly to the slot.

In testimony that I claim the above, I have hereunto subscribed my name.

RICHARD F. KRAUSE.